United States Patent [19]
Carcia

[11] 3,740,569
[45] June 19, 1973

[54] DIRECT-CURRENT POWER SUPPLY SYSTEM

[75] Inventor: Hernando J. Carcia, San Francisco, Calif.

[73] Assignee: Integrated Systems Technology, Inc., Garland, Tex.

[22] Filed: Aug. 26, 1971

[21] Appl. No.: 175,305

[52] U.S. Cl. .................. 307/11, 307/28, 307/32, 320/48, 323/23
[51] Int. Cl. ............................................. H02j 7/00
[58] Field of Search ................. 307/11, 12, 18, 24, 307/28, 29, 32, 33, 38, 43, 48, 52, 53, 55; 320/48; 321/27; 323/4, 23, 25

[56] References Cited
UNITED STATES PATENTS

| | | | |
|---|---|---|---|
| 3,548,294 | 12/1970 | Houghton | 323/4 |
| 3,534,354 | 10/1970 | Galginaitis | 320/48 X |
| 3,445,746 | 5/1969 | Delatorre | 320/40 |
| 3,475,061 | 10/1969 | Steinkamp et al. | 320/48 X |
| 3,602,794 | 8/1971 | Westhaver | 323/4 |
| 3,512,044 | 5/1970 | Jones | 317/16 |
| 3,229,164 | 1/1966 | McCartney et al. | 307/29 X |
| 3,400,325 | 9/1968 | Webb | 307/24 X |
| 3,473,039 | 10/1969 | Fegley | 307/11 |
| 3,538,405 | 11/1970 | Borden et al. | 321/27 R |
| 3,619,635 | 11/1971 | Thompson et al. | 307/11 |

*Primary Examiner*—William M. Shoop, Jr.
*Attorney*—Jack A. Kanz

[57] ABSTRACT

A plurality of voltage regulator circuits are connected to a battery for producing regulated positive and negative output voltages of different values. A warning circuit is provided for causing a light emitting diode to blink when the battery voltage falls below a first value. An automatic shutdown circuit is provided for disabling the regulator circuits when the battery voltage falls below a second and lower value. An overload circuit is provided for rapidly blowing a protective fuse when the output voltage of one of the regulator circuits exceeds a desired value.

10 Claims, 2 Drawing Figures

DIRECT-CURRENT POWER SUPPLY SYSTEM

BACKGROUND OF THE INVENTION

This invention relates to direct-current power supply systems and, particularly, to direct-current power systems used in connection with relatively sophisticated battery-operated electronic equipment for providing the operating voltages required by such equipment.

While not limited thereto, the present invention is particularly useful in connection with a newly developed hand-carried battery-operated portable radio telephone capable of automatically receiving and placing incoming and outgoing telephone calls with substantially the same ease as an ordinary dial telephone. Such newly developed portable telephone employs relatively complex computer-type logic circuitry which requires regulated direct-current operating voltages of different polarities and values. In order to minimize the size of such portable telephone, the direct-current power supply system for supplying such voltages should be as simple and as compact as possible. In order to minimize drain on the battery and, thus, to provide the maximum use time between battery replacement or recharging, the direct-current power supply system should be as efficient as possible in terms of power consumption.

Since the logic circuits in the portable telephone may not perform properly when the battery becomes discharged, it would be desirable to provide the user with some warning of the occurrence of such a discharged condition or, more preferably, an advance warning that the battery is starting to become discharged. In addition, in order to minimize cluttering of the air waves and the like, it would be desirable to provide means for automatically shuting off the power supply system when the battery voltage falls below a critical level below which satisfactory performance of the portable telephone is unlikely. It would be further desirable that the power supply system include protective circuitry for preventing the application of excessive operating voltages to the logic circuits to prevent damage to same.

It is an object of the invention, therefore, to provide a new and improved direct-current power supply system for battery-operated electronic equipment.

It is another object of the invention to provide a new and improved direct-current power supply system of a compact and efficient character for providing a plurality of regulated output voltages of different polarities and values.

It is a further object of the invention to provide new and improved warning and shutdown circuitry for a battery-operated direct-current power supply system for warning the user of the existence of a lower than normal battery voltage and for preventing use of the equipment powered by the power supply system when the battery voltage condition becomes highly unsatisfactory.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF FIG. 1

Figure 1:
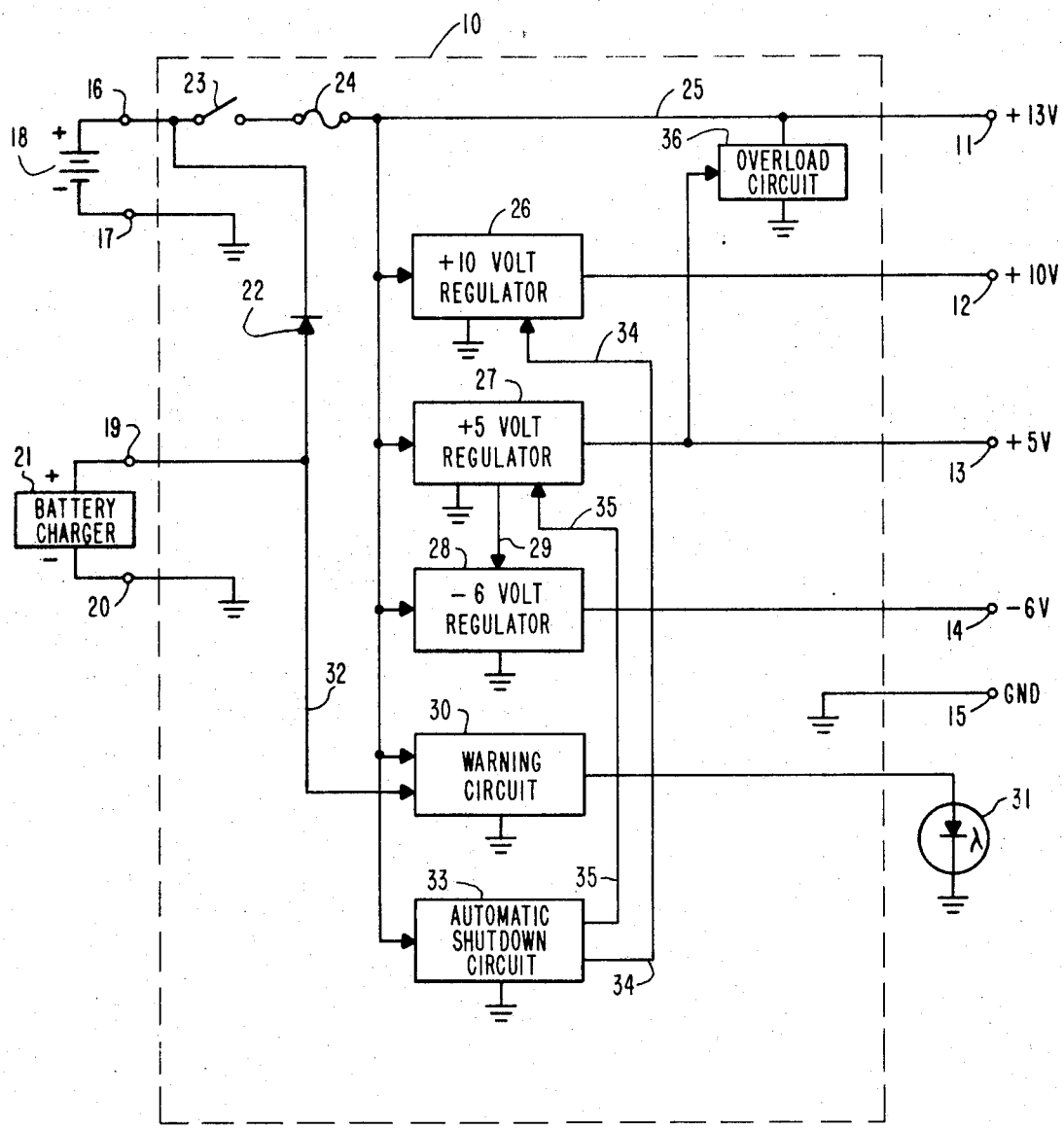
FIG. 1 is a block diagram of a direct-current power supply system constructed in accordance with the present invention.

Referring to FIG. 1, there is shown a direct-current power supply system 10 for providing at output terminals 11–14 direct-current voltages of different polarities and values, a common current return being provided by terminal 15 which is connected to a point of fixed reference potential represented by circuit ground. The system 10 further includes a pair of input terminals 16 and 17 adapted to be connected to a battery 18 of predetermined value. Terminal 17 is grounded to circuit ground. By way of example only, battery 18 may be a rechargeable relatively long life nickel-cadmium battery having a nominal operating voltage of 13 volts when charged. By way of example only, the output voltages appearing at output terminals 11–14 may have nominal values of +13 volts, +10 volts, +5 volts and −6 volts, respectively. In use, output terminals 11–14 are connected to various loads represented by different circuit portions in a piece of electronic equipment such as, for example, a portable radio telephone.

A second pair of input terminals 19 and 20 are provided for enabling connection of a battery charger 21 to the system 10 for purposes of recharging the battery 18. Battery charger terminal 19 is connected to the upper battery terminal 16 by way of a diode 22, the lower battery charger terminal 20 being connected to circuit ground the same as is the lower battery terminal 17. Battery charger 21 is not connected to the system 10 during the normal usage thereof. It is only connected thereto in a temporary manner when the battery 18 needs recharging.

The ungrounded battery terminal 16 is connected by way of a two-position switch 23, a protective thermal-type fuse 24 and conductor 25 to the upper output terminal 11. Switch 23 represents the master on-off switch and is closed when it is desired to place the power supply system 10 in an operative condition. Switch 23 is placed in its open position when the system 10 is not in use.

A first voltage regulator 26 is coupled to the ungrounded battery terminal 16 by way of switch 23 and fuse 24 for supplying to a load connected to output terminal 12 a regulated direct-current voltage having a nominal value of, for example, +10 volts. A second voltage regulator 27 is coupled to the ungrounded battery terminal 16 in a like manner for supplying to a load connected to output terminal 13 a regulated direct-current voltage having a nominal value of, for example, +5 volts. A third voltage regulator 28 is connected to the ungrounded battery terminal 16 for supplying to a load connected to output terminal 14 a regulated direct-current voltage having a nominal value of, for example, −6 volts. As will be seen, the +5 volt regulator 27 is of the switching type and, as such, produces a pulsating voltage signal which is supplied by way of a conductor 29 to the −6 volt regulator 28 for controlling the operation thereof.

The power supply system 10 further includes a warning circuit 30 which is coupled to the ungrounded battery terminal 16 by way of switch 23 and fuse 24 for causing a light emitting device represented by a light emitting diode 31 to blink when the terminal voltage of battery 18 falls below a predetermined value of, for example, approximately 12.5 volts. The lower the battery voltage falls below this threshold level, the faster the rate at which the light emitting diode 31 blinks or flashes on and off. Thus, the user of the electronic equipment being powered by the power supply system 10 is not only warned that the battery 18 is becoming run down but is also provided with a qualitative indication of the extent to which it is run down. Warning circuit 30 is further connected to the battery charger terminal 19 by way of conductor 32 for purposes of causing the light emitting diode 31 to emit light in a continuous manner whenever the battery charger 21 is connected to the system 10. This warns the user that the battery is being charged.

The power supply system 10 also includes an automatic shutdown circuit 33 which is coupled to the ungrounded battery terminal 16 by way of switch 23 and fuse 24 for disabling the voltage regulators 26, 27 and 28 when the output voltage of battery 18 falls below a second predetermined level which is lower than the predetermined level or threshold level for the warning circuit 30. This threshold level for the shutdown circuit 33 may have a value of, for example, approximately 11 volts. The disabling or turning off of the +10 volt regulator 26 is accomplished by the signal condition on conductor 34, while the disabling or turning off of the +5 volt regulator 27 is accomplished by the signal condition on conductor 35. Since the −6 volt regulator 28 is dependent on the +5 volt regulator 27, the former is disabled by the disabling of the latter. The presence of the automatic shutdown circuit 33 prevents the use of the electronic equipment powered by the power supply system 10 when the output voltage of battery 18 has become so low that such electronic equipment will not perform in a satisfactory manner.

The power supply system 10 further includes an overload circuit 36 connected to the load side of the thermal fuse 24 for shorting the fuse 24 across the battery 18 for rapidly blowing the fuse 24 when the load voltage at the +5 volt output terminal 13 exceeds a predetermined value. The threshold level at which the overload circuit 36 becomes operative may be, for example, approximately 5.6 volts. This rapid blowing of the fuse 24 guards against the uncertainties inherent in the blowing of thermal type fuses and provides a positive protection for the relatively delicate electronic circuits connected to the +5 volt output terminal 13.

DESCRIPTION OF FIG. 2

Figure 2:
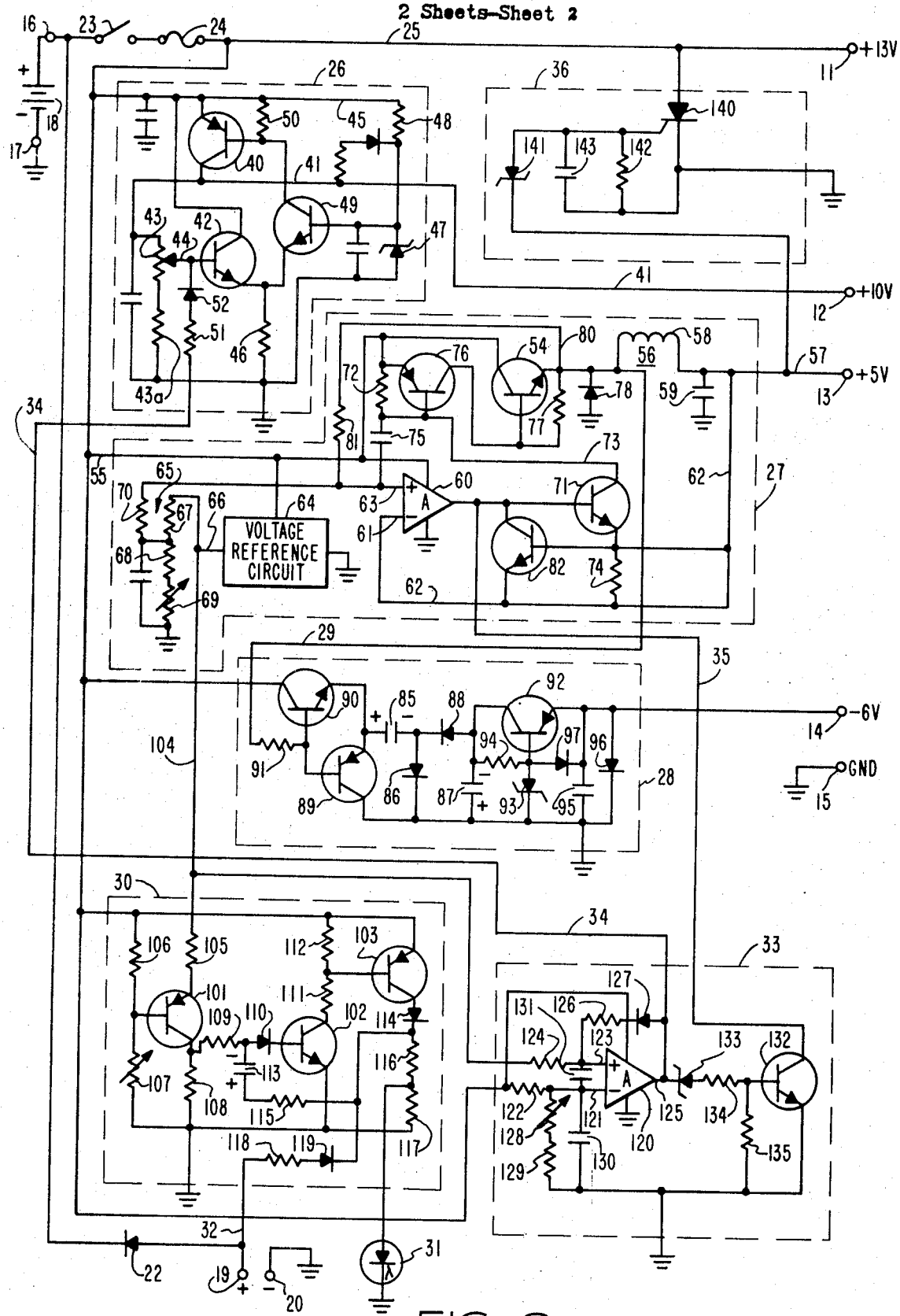
FIG. 2 is a more detailed schematic circuit diagram of the FIG. 1 system.

Referring now to FIG. 2 of the drawings, there is shown a more detailed schematic circuit diagram of the FIG. 1 system. Considering first the +10 volt regulator 26, such regulator 26 includes a series pass transistor 40 for passing direct current from the battery 18 and by way of a conductor 41 to the load connected to the output terminal 12. The voltage level on conductor 41 is sensed by a second transistor 42 having its base electrode connected to the conductor 41 by way of a voltage dividing potentiometer 43, the base electrode of transistor 42 being connected to a sliding tap 44 on such potentiometer 43. The collector of transistor 42 is connected to a conductor 45 which receives the output voltage from battery 18, while the emitter of transistor 42 is connected by way of a resistor 46 to circuit ground. A reference voltage for determining the regulating action of the regulator 26 is provided by a Zener diode 47 having one end connected to the battery supply conductor 45 by way of a resistor 48 and the other end connected to circuit ground. The relatively constant reference voltage produced across Zener diode 47 is supplied to the base electrode of a third transistor 49. The collector of transistor 49 is connected to the battery supply conductor 45 by way of a resistor 50, while the emitter of transistor 49 is connected to circuit ground by way of resistor 46. The collector of transistor 49 is also connected to the base electrode of series pass transistor 40. The automatic shutdown signal appearing on shutdown circuit output conductor 34 is coupled to the base electrode of the second transistor 42 by way of a resistor 51 and a diode 52.

In operation, Zener diode 47 develops thereacross a constant magnitude reference voltage which drives the base electrode of the transistor 49. This causes current flow through resistor 50, transistor 49 and resistor 46 to circuit ground. The voltage drop across resistor 50 turns on the series pass transistor 40 and causes a voltage to appear on the output conductor 41. This voltage is divided by potentiometer 43 and resistor 43a to provide a driving voltage for the base electrode of the transistor 42. This turns on transistor 42 and causes current to flow therethrough by way of its collector and emitter electrodes and then through the common emitter resistor 46 to circuit ground.

If the voltage on output conductor 41 becomes greater than a certain equilibrium value, the voltage supplied to the base electrode of transistor 42 increases to increase the current flow through transistor 42 to, in turn, increase the voltage drop across the common emitter resistor 46. This reduces the base-to-emitter bias of the transistor 49 which, in turn, reduces the collector-to-emitter current flow through transistor 49 which, in turn, reduces the voltage drop across resistor 50. This reduces the base-to-emitter bias of the series pass transistor 40 which, in turn, reduces the voltage on the output conductor 41 back to the equilibrium value. If, on the other hand, the voltage on output conductor 41 decreases below the equilibrium value, then the reverse of this process occurs. More particularly, the collector-to-emitter current flow through transistor 42 is reduced and this reduces the voltage drop across common emitter resistor 46. This increases the collector-to-emitter current flow through transistor 49 and, hence, the bias voltage drop across resistor 50. This makes series pass transistor 40 more conductive and brings the voltage on output conductor 41 back up to the equilibrium value. The equilibrium value of the voltage on output conductor 41 is determined by the setting of the sliding tap 44 on the potentiometer 43. By proper adjustment of this sliding tap 44, the desired output voltage is provided on the output conductor 41.

Considering now the +5 volt regulator 27, such regulator 27 is of the switching type. As such, regulator 27 includes switching circuit means represented by a series pass transistor 54 for converting the steady battery voltage supplied by battery 18 into a pulsating voltage. The collector of transistor 54 is connected to the ungrounded battery terminal 16 by way of an input conductor 55, while the emitter of transistor 54 is connected to a filter circuit 56 for smoothing the pulsating voltage and supplying such smoothed voltage to the system output terminal 13 by way of output conductor 57. Filter circuit 56 includes a choke coil 58 and a capacitor 59 connected to the load side thereof.

The +5 volt regulator 27 further includes control circuit means responsive to the magnitude of the load voltage on output conductor 57 for controlling the switching transistor 54 for regulating the magnitude of the smoothed voltage supplied to the load connected to output terminal 13. This control circuit means includes a differential amplifier 60 having an inverting input terminal 61 connected to the output conductor 57 by way of conductor 62. Amplifier 60 further includes a non-inverting input terminal 63 which is connected to a voltage reference circuit 64 by way of a voltage divider network 65. Voltage reference circuit 64 is connected between the battery voltage conductor 55 and circuit ground and provides at output terminal 66 thereof a direct-current reference voltage of constant value with respect to circuit ground. This reference voltage at terminal 66 is divided down by resistors 67, 68 and 69 and supplied to the non-inverting input 63 of amplifier 60 by way of amplifier input resistor 70.

The output of amplifier 60 drives the base electrode of a transistor 71 having its collector connected to the battery voltage supply conductor 55 by way of resistor 72 and conductor 73. The emitter of transistor 71 is connected by way of a resistor 74 and conductor 62 to the output conductor 57. A capacitor 75 is connected between the lower end of resistor 72 and the non-inverting input terminal 63 of amplifier 60. The base and emitter electrodes of a further transistor 76 are connected across the resistor 72, the collector of transistor 76 being connected to the base electrode of the series pass transistor 54 and, by way of a resistor 77, to the emitter electrode of the series pass transistor 54. A diode 78 is connected between the emitter of transistor 54 and circuit ground. A positive feedback path is provided between the emitter of series pass transistor 54 and non-inverting input 63 of amplifier 60 by means of a conductor 80 and a resistor 81 of relatively large ohmic value. A further transistor 82 is provided for limiting the load current to a safe value. The collector of transistor 82 is connected to the base of transistor 71, the emitter is connected to the negative feedback conductor 62 and the base of transistor 82 is connected to the emitter of transistor 71.

Amplifier 60, voltage reference circuit 64 and transistors 71 and 82 may be packaged as a single integrated circuit chip and, as such, may take the form of the type $\mu$A723 integrated circuit "Precision Voltage Regulator" manufactured by the Fairchild Semiconductor Division of Fairchild Camera and Instrument Corporation of Mountain View, Calif., and other manufacturers.

Considering now the operation of the +5 volt regulator 27, amplifier 60 and transistors 71 and 76 cooperate with the series pass transistor 54 and the choke coil 58 and condenser 59 to provide an oscillator circuit for producing a square wave type pulsating voltage at the emitter of the series pass transistor 54. This pulsating voltage is then smoothed by the filter circuit 56 to provide at regulator output terminal 13 a relatively smooth and regulated direct-current voltage of substantially lower voltage than the terminal voltage of battery 18. More particularly, the voltage reference circuit 64 produces at its output terminal 66 a positive direct-current voltage which is divided down by resistors 67–69 to provide at the non-inverting input terminal 63 of amplifier 60 a positive reference voltage of, for example, 5 volts. This produces at the output of amplifier 60 an amplified positive voltage which turns on the transistor 71. The resulting current flow through resistor 72 turns on transistor 76. The resulting current flow through resistor 77 turns on the series pass transistor 54. This enables the battery voltage on conductor 55 to charge the capacitor 59 by way of transistor 54 and choke coil 58. At this time, the positive feedback by way of conductor 80 and resistor 81 increases the total voltage at the non-inverting input terminal 63 of amplifier 60 by a relatively small amount on the order of, for example, 20 to 30 millivolts.

When the charging of capacitor 59 reaches a point where the voltage across such capacitor 59 becomes equal to the total voltage (reference plus feedback) at the non-inverting input terminal 63 of amplifier 60, the negative feedback to inverting input terminal 61 by way of conductor 62 becomes equal to the non-inverting terminal voltage and the difference voltage at the output of amplifier 60 goes to zero and transistor 71 is turned off. This turns off transistor 76 which, in turn, turns off the series pass transistor 54. Choke coil 58 thereupon commences to maintain the previous current flow to the capacitor 59 and to the load, such current at this time flowing upward through the diode 78 and through the coil 58 to the capacitor 59 and the load connected to output terminal 13. With transistor 54 turned off and diode 78 conductive, the voltage at the emitter of transistor 54 falls to very nearly a zero value. This removes the feedback voltage via conductor 80 and resistor 81 which was previously added to the reference voltage and reduces the voltage at the non-inverting input terminal 63 of amplifier 60 to substantially the value of the reference voltage alone. As the capacitor 59 continues to discharge through the load, the voltage thereacross starts to decreases. When this voltage decreases to a value less than the reference voltage at the non-inverting input terminal 63, the output of amplifier 60 again goes positive to turn on transistors 71, 76 and 54. This reapplies the feedback voltage via resistor 81 to the non-inverting input terminal 63 and the capacitor 59 commences to charge back up to the voltage level (reference plus feedback) at the non-inverting input terminal 63. When the voltage on capacitor 59 reaches this value, transistors 71, 76 and 54 are again turned off and the cycle repeated.

Thus, the series pass transistor 54 is turned on and off in a repetitive manner to produce a square wave type pulsating voltage at the emitter thereof. This pulsating voltage is smoothed by the choke coil 58 and capacitor 59 to produce a relatively smooth direct-current voltage on output conductor 57. There is, of course, a small ripple voltage present on the output conductor 57 because, as just considered, the capacitor 59 undergoes a slight charging and discharging action in order to produce the desired circuit oscillations. This ripple voltage is, however, relatively small being on the order of approximately one percent or less of the nominal output voltage on conductor 57.

Regulator action is provided by the fact that the voltage across capacitor 59 is tied to the reference voltage value at the junction between resistors 67 and 68 by the feedback action of the oscillator circuitry. Thus, for example, if the operating terminal voltage of the battery 18 should decrease, then the series pass transistor 54 is caused to stay on longer until the voltage across capacitor 59 reaches the desired value corresponding very nearly to the value of the reference voltage. The same thing occurs if the output voltage on conductor 57 is decreased due to a decrease in the load resistance connected to output terminal 13. Conversely, if the output voltage on conductor 57 increases, then capacitor 59 charges up faster and the frequency of oscillation is increased. Thus, the frequency of oscillation decreases if the output voltage decreases and increases if the output voltage increases, this change in frequency (actually "on" time of transistor 54) serving to maintain the charge on capacitor 59 at the desired value corresponding to the reference voltage value at the non-inverting input terminal 63 of amplifier 60.

Considering now the −6 volt regulator 28, such regulator 28 includes a first capacitor 85 and a first diode 86 connected in series with one another. Regulator 28 also includes a second capacitor 87 and a second diode 88 connected in series with one another, with this series combination being connected in parallel across the first diode 86. Regulator 28 further includes a first transistor 89 connected by its emitter and collector electrodes in parallel with the series connected first capacitor 85 and first diode 86. A second transistor 90 is connected by its emitter and collector electrodes in series between the ungrounded battery terminal 16 and the capacitor end of the circuit branch formed by capacitor 85 and diode 86, the other end of this circuit branch being connected to the grounded battery terminal 17 by way of circuit ground. The base electrodes of both of transistors 89 and 90 are connected by way of a common resistor 91 and conductor 29 to the oscillator circuitry located in the previously considered +5 volt regulator 27.

Transistors 89 and 90 and diodes 86 and 88 act like switches for first enabling the voltage from battery 18 to charge the first capacitor 85 and then enabling the first capacitor 85 to charge the second capacitor 87 in an opposite polarity manner such that the voltage at the ungrounded terminal of the second capacitor 87 is of negative polarity. Transistors 89 and 90 are controlled by the pulsating signal supplied from the +5 volt regulator 27 by way of the conductor 29. This pulsating signal is a rectangular wave type signal the positive-going peaks of which are at a voltage level somewhere on the order of +10 to +13 volts and the negative-going troughs of which are at a voltage level of zero. Each positive peak of this pulsating signal turns on the transistor 90 and enables charging current to flow from the battery 18, through transistor 90, capacitor 85 and diode 86 to ground. At this time, the transistor 89 is turned off. During each zero voltage trough, the lower transistor 89 is turned on and the upper transistor 90 is turned off. The first capacitor 85 thereupon acts to charge the second capacitor 87, the current flow being upward through the capacitor 87, through diode 88, capacitor 85, transistor 89 and back to circuit ground.

Capacitor 87 is coupled to the regulator output terminal 14 by way of a series pass transistor 92. The base electrode of transistor 92 is connected to circuit ground by way of a Zener diode 93. Current flow through the Zener diode 93 and resistor 94 holds the base electrode of transistor 92 at a fixed negative reference voltage with respect to circuit ground. When transistor 92 is conductive, a constant voltage drop exists between the emitter and base electrodes thereof. This, coupled with the fixed reference voltage provided by Zener diode 93, serves to provide the constant or regulated voltage at the regulator output terminal 14. A smoothing capacitor 95 and a diode 96 are connected in parallel between the emitter of transistor 92 and circuit ground, while a further diode 97 is connected between the emitter and base electrodes of transistor 92.

Considering now the warning circuit 30, such circuit includes a voltage comparator circuit provided by transistor 101 and a relaxation oscillator circuit provided by transistors 102 and 103. When the voltage of battery 18 is above the warning threshold, transistors 101, 102 and 103 are non-conductive and the light-emitting diode 31 is turned off. The reference voltage produced by voltage reference circuit 64 in the +5 volt regulator 27 is supplied to the emitter of transistor 101 by way of conductor 104 and resistor 105. Voltage from battery 18 is supplied to the base electrode of transistor 101 by way of voltage dividing resistors 106 and 107. Resistor 107 is of the adjustable type and the setting thereof determines the warning threshold. As the battery 18 becomes discharged during usage, the battery voltage decreases. When the batter voltage falls below the warning threshold, the divided voltage at the base electrode of transistor 101 falls below the reference voltage at the emitter of transistor 101 and transistor 101 is turned on. The resulting voltage drop across collector resistor 108 is supplied to the base electrode of transistor 102 by way of resistor 109 and diode 110 to turn on the transistor 102. The resulting collector-to-emitter current flow through resistors 111 and 112 produces a voltage drop across the resistor 112 which turns on the transistor 103. With transistor 103 conductive, a timing capacitor 113 is charged by current flow through transistor 103, diode 114, resistor 115, capacitor 113 and resistor 109, the charge on capacitor 113 being such that the terminal thereof connected to the resistor 109 is negative with respect to the other terminal thereof which is connected to the resistor 115. At the same time, current flows through transistor 103, diode 114 and resistors 116 and 117 to provide an energizing voltage which turns on the light-emitting diode 31.

When the voltage across timing capacitor 113 reaches a certain value, diode 114 turns off and the timing capacitor 113 commences to discharge the discharge current flowing by way of resistors 108, 109, capacitor 113, and resistors 115, 116 and 117 to circuit ground. This places the junction point between resistor 109 and diode 110 at a negative voltage with respect to circuit ground. This turns off the transistor 102 which, in turn, turns off the transistor 103. At this time, the light-emitting diode 31 is turned off also. After the timing capacitor 113 discharges sufficiently, the voltage drop across resistor 108 caused by collector current flow from transistor 101 again turns the transistor 102 back on and the foregoing cycle is repeated. Thus, the light-emitting diode 31 is turned on and off or blinks in a repetitive manner as the relaxation oscillator circuit oscillates. The lower the value of the output voltage of battery 18, the harder the transistor 101 is turned on and the greater is the voltage drop across collector resistor 108. The greater such voltage drop, the shorter the time required to charge and discharge the timing capacitor 113. Thus, as the voltage of battery 18 decreases, the frequency of oscillation of the relaxation oscillator increases. Thus, the light-emitting diode 31 blinks at a faster rate as the battery voltage gets lower.

If the battery charger 21 (FIG. 1) is connected to charger input terminals 19 and 20 and is turned on, then, in addition to charging the battery 18 by way of diode 22, current from such battery charger 21 also flows by way of a resistor 118, a diode 119 and resistor 116 to the light-emitting diode 31 to turn on such light-emitting diode 31 in a continuous manner. This warns the operator that the battery 18 is being charged.

Considering now the automatic shutdown circuit 33, such circuit constitutes means responsive to the voltage of battery 18 for disabling the +10 volt regulator 26 and the +5 volt regulator 27 when the battery voltage falls below a second predetermined value. The threshold level for the automatic shutdown circuit 33 is lower than the threshold level for the warning circuit 30. Shutdown circuit 33 includes a Schmidt trigger circuit formed by a differential amplifier 120 and the circuit components connected thereto. The inverting input terminal 121 of amplifier 120 is coupled to the battery 18 by way of input resistor 122. The non-inverting input terminal 123 of amplifier 120 is connected to the voltage reference circuit 64 in the +5 volt regulator 27 by way of an input resistor 124 and conductor 104. A feedback path is provided between the output terminal 125 of the amplifier 120 and the non-inverting input terminal 123 of the amplifier 120 by a resistor 126 and a diode 127. The inverting input terminal 121 is connected to circuit ground by resistors 128 and 129, a capacitor 130 being connected in parallel across such resistors. A further capacitor 131 is connected between the inverting and non-inverting input terminals 121 and 123.

The circuit portion of the shutdown circuit 33 thus far described behaves like a Schmidt trigger circuit with the trigger level being fixed by the reference voltage supplied to the non-inverting input terminal 123 of the amplifier 120. If the divided battery voltage appearing at the inverting input terminal 121 is greater than the reference voltage at terminal 123, then the circuit is in a first condition and the output of the amplifier 120 is low. This represents the case where the battery 18 has not run down an excessive amount. When, on the other hand, the divided battery voltage at inverting input terminal 121 falls below the reference voltage at terminal 123, the circuit assumes its second condition and the output of the amplifier 120 goes to a relatively high positive value. The positive feedback by way of resistor 126 and diode 127 facilitates this process and makes the switching action more positive.

The signal at the output of amplifier 120 is supplied by way of conductor 34 to the +10 volt regulator 26. When the output of amplifier 120 is high (battery 18 discharged), the positive voltage on conductor 34 causes the transistor 42 in regulator 26 to conduct fairly heavily. This produces a larger voltage drop across resistor 46 and turns off the transistor 49. This turns off the series pass transistor 40 and thus disables the +10 volt regulator 26, the output voltage at terminal 12 going to zero.

The output of amplifier 120 also drives a switch circuit formed by a transistor 132 for purposes of controlling the operative status of the +5 volt regulator 27. The collector of transistor 132 is connected by way of conductor 35 to the base electrode of transistor 71 in the +5 volt regulator 27, the emitter of transistor 132 being connected to circuit ground. The base electrode of transistor 132 is coupled to the output terminal 125 of amplifier 120 by way of a Zener diode 133 and a resistor 134. The base electrode of transistor 132 is also connected to circuit ground by a resistor 135.

When the voltage of battery 18 is satisfactory, the output of amplifier 120 is low and the Zener diode 133 remains non-conductive. As a result, transistor 132 is non-conductive and has no effect on the +5 volt regulator circuit 27. When, on the other hand, the output voltage of battery 18 becomes excessively low, the output of amplifier goes high and Zener diode 133 turns on. This turns on the transistor 132 which, in effect, then shorts to circuit ground the base electrode of the transistor 71 in the regulator 27. This turns off the transistor 71 which, in turn, turns off the transistor 76 and the series pass transistor 54. This disables the +5 volt regulator 27 and the output voltage on terminal 13 goes to zero.

The turning off of the +5 volt regulator 27 also turns off the −6 volt regulator 28. This occurs because the +5 volt regulator 27 is no longer oscillating and a pulsating signal is no longer being supplied by way of conductor 29 to the base electrodes of transistors 89 and 90. Thus, the transistor 90 remains non-conductive and the voltage on regulator output terminal 14 goes to zero.

Considering now the overload circuit 36, such circuit 36 includes a semiconductor switching device, represented by a silicon controlled rectifier 140, for shorting the thermal fuse 24 across the battery 18 when the load voltage at the +5 volt output terminal 13 exceeds a predetermined value. The gate electrode of the silicon controlled rectifier 140 is connected to the output line 57 of the +5 volt regulator 27 by way of a Zener diode 141. A resistor 142 and capacitor 143 are connected between the gate electrode of silicon controlled rectifier 140 and circuit ground. The threshold level for the overload circuit 36 is established by the Zener diode 141. By way of example only, such threshold level may have a value of 5.6 volts. When the output of regulator 27 is less than this threshold value, Zener diode 141 is non-conductive and the silicon controlled rectifier 140 is likewise non-conductive. When the output voltage of regulator 27 exceeds this threshold level, Zener diode 141 conducts and triggers or turns on the silicon controlled rectifier 140. This effectively short circuits the load side of the fuse 24 to circuit ground and causes a rapid and positive blowing of the fuse 24. This disables the entire direct-current power supply system and thus protects the electronic circuits which are powered by such power supply system.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A direct-current power supply system comprising:
    a pair of terminal means adapted to be connected to a battery of predetermined voltage value, one of such terminal means being grounded to circuit ground;
    switching-type regulator circuit means coupled to the ungrounded battery terminal means for supplying to a load a regulated direct-current voltage of lesser value and of the same polarity as the voltage at the ungrounded battery terminal, such switching-type regulator circuit means including switching circuit means for converting the battery voltage into a pulsating voltage, filter circuit means for smoothing the pulsating voltage and supplying the smoothed voltage to a load and control circuit means responsive to the magnitude of the load voltage for controlling the switching circuit means for regulating the magnitude of the smoothed voltage supplied to the load;

and second regulator circuit means coupled to the ungrounded battery terminal means and including capacitor means, charging circuit means responsive to the switching regulator pulsating voltage for producing across the capacitor means a direct-current voltage of polarity opposite to the polarity of the voltage at the ungrounded battery terminal means and circuit means for supplying the opposite polarity capacitor voltage to a load.

2. A direct-current power supply system in accordance with claim 1 and including warning circuit means comprising light emitting means and level sensitive oscillator circuit means coupled to the ungrounded battery terminal means and to the light emitting means and responsive to the battery voltage level for causing the light emitting means to blink when such battery voltage level falls below a predetermined value.

3. A direct-current power supply system in accordance with claim 1 and including circuit means coupled to the ungrounded battery terminal means and responsive to the battery voltage for disabling the switching circuit means in the switching-type regulator circuit means when the battery voltage falls below a predetermined level.

4. A direct-current power supply system in accordance with claim 1 wherein a protective fuse is connected in series between the ungrounded battery terminal means and the regulator circuit means and wherein the system includes overload circuit means connected to the regulator side of the fuse and responsive to the load voltage produced by one of the regulator circuit means for rapidly blowing the fuse when this load voltage exceeds a predetermined value.

5. A direct-current power supply system in accordance with claim 4 and including:

warning circuit means comprising light emitting means and level sensitive oscillator circuit means coupled to the ungrounded battery terminal means and to the light emitting means and responsive to the battery voltage for causing the light emitting means to blink when such battery voltage falls below a first predetermined level;

and circuit means coupled to the ungrounded battery terminal means and responsive to the battery voltage for disabling the switching circuit means in the switching-type regulator circuit means when the battery voltage falls below a second predetermined level which is less than the predetermined level for the warning circuit means.

6. A direct-current power supply system comprising:

circuit means for supplying a direct-current voltage of a particular polarity with respect to a point of fixed reference potential;

oscillator circuit means for producing a pulsating signal;

capacitor means;

and charging circuit means coupled to the direct-current voltage supply circuit means and responsive to the oscillator pulsating signal for producing across the capacitor means a direct-current voltage of opposite polarity with respect to the point of fixed reference potential.

7. A direct-current power supply system comprising:

circuit means for supplying a direct-current voltage of a particular polarity with respect to a point of fixed reference potential;

oscillator circuit means for producing a pulsating signal;

first and second capacitor means;

and switching circuit means coupled to the direct-current voltage supply circuit means and to the capacitor means and responsive to the oscillator pulsating signal for alternately charging the first capacitor from the direct-current voltage supply means and discharging the first capacitor through the second capacitor for producing across the latter a direct-current voltage of opposite polarity with respect to the point of fixed reference potential.

8. A direct-current power supply system comprising:

a pair of terminal means adapted to be connected to a battery;

a first capacitor and a first diode connected in series with one another;

a second capacitor and a second diode connected in series with one another, this series combination being connected in parallel with the first diode;

a first transistor connected by its emitter and collector electrodes in parallel with the series connected first capacitor and first diode;

a second transistor connected by its emitter and collector electrodes in series between one of the battery terminal means and one end of the circuit branch formed by the series connected first capacitor and first diode, the other end of this circuit branch being connected to the other of the battery terminal means;

and oscillator circuit means coupled to the base electrodes of both transistors for supplying thereto a pulsating voltage for repetitively turning the transistors on and off with one transistor being on when the other is off and vice versa.

9. A direct-current power supply system comprising:

a battery for supplying direct-current power to a load;

light emitting means;

and level sensitive oscillator circuit means coupled to the battery and to the light emitting means and responsive to the battery voltage level for causing the light emitting means to blink when such battery voltage level falls below a predetermined value.

10. A direct-current power supply system in accordance with claim 9 and including circuit means for supplying a reference voltage and wherein the level sensitive oscillator circuit means includes:

comparator circuit means responsive to the reference voltage and to the battery voltage for producing a difference voltage when the battery voltage falls below a predetermined value;

and relaxation oscillator circuit means responsive to the difference voltage for causing the light emitting means to blink at a rate which increases as the battery voltage decreases.

* * * * *